United States Patent
Hendrickson et al.

(10) Patent No.: US 9,352,185 B2
(45) Date of Patent: May 31, 2016

(54) EXERCISE DEVICE WITH INCLINATION ADJUSTING MECHANISM

(75) Inventors: Rick Hendrickson, River Heights, UT (US); Greg Law, Smithfield, UT (US)

(73) Assignee: ICON Health & Fitness, Inc., Logan, UT (US)

( * ) Notice: Subject to any disclaimer, the term of this patent is extended or adjusted under 35 U.S.C. 154(b) by 448 days.

(21) Appl. No.: 13/544,920

(22) Filed: Jul. 9, 2012

(65) Prior Publication Data

US 2013/0017929 A1    Jan. 17, 2013

Related U.S. Application Data

(60) Provisional application No. 61/506,776, filed on Jul. 12, 2011.

(51) Int. Cl.
*A63B 22/00* (2006.01)
*A63B 22/02* (2006.01)
*F16H 25/20* (2006.01)
*A63B 22/06* (2006.01)

(52) U.S. Cl.
CPC ......... *A63B 22/0023* (2013.01); *A63B 22/0235* (2013.01); *F16H 25/2056* (2013.01); *A63B 22/0056* (2013.01); *A63B 22/0076* (2013.01); *A63B 22/0664* (2013.01); *F16H 2025/2081* (2013.01); *Y10T 74/18672* (2015.01)

(58) Field of Classification Search
CPC ............... A63B 22/0023; A63B 22/02; A63B 22/0235; A63B 22/0056; A63B 22/0076; A63B 22/0664; A63B 22/00235; F16H 25/2056; F16H 25/20; Y10T 74/18672
USPC .......... 482/54, 51, 70; 74/89.35, 89
See application file for complete search history.

(56) References Cited

U.S. PATENT DOCUMENTS

| | | | | |
|---|---|---|---|---|
| 1,893,728 A * | 1/1933 | Bullis | | 254/102 |
| 2,674,453 A * | 4/1954 | Hummert | | 49/355 |
| 4,651,581 A * | 3/1987 | Svensson | | 74/89.35 |
| 4,729,558 A * | 3/1988 | Kuo | | 482/54 |
| 4,818,175 A * | 4/1989 | Kimura | | 414/730 |
| 5,123,629 A * | 6/1992 | Takeuchi | | 254/103 |
| 5,313,852 A * | 5/1994 | Arena | | 74/89.35 |
| 5,816,981 A * | 10/1998 | Hung | | 482/54 |
| 6,761,387 B2 * | 7/2004 | Sloss | | 296/3 |
| 6,761,667 B1 * | 7/2004 | Cutler et al. | | 482/54 |
| 6,913,563 B2 * | 7/2005 | Chen | | 482/54 |
| 6,926,644 B2 * | 8/2005 | Chen | | 482/54 |
| 7,041,038 B2 * | 5/2006 | Smith et al. | | 482/54 |
| 7,225,694 B2 * | 6/2007 | Said | | 74/89.35 |
| 7,285,075 B2 * | 10/2007 | Cutler et al. | | 482/54 |
| 7,537,549 B2 * | 5/2009 | Nelson et al. | | 482/54 |
| 7,862,483 B2 * | 1/2011 | Hendrickson et al. | | 482/54 |
| 2002/0171070 A1 * | 11/2002 | Shim | | 254/103 |
| 2003/0183027 A1 * | 10/2003 | Koch | | 74/89.35 |

(Continued)

*Primary Examiner* — Sundhara Ganesan
(74) *Attorney, Agent, or Firm* — Holland & Hart LLP

(57) ABSTRACT

A telescoping extension device includes a lead cylinder having a bore extending at least partially therethrough with at least a portion of the bore being threaded and a first lead screw disposed at least partially within the bore of the lead cylinder with at least a portion of an outer surface of the first lead screw having threads that engage the threads within the bore of the lead cylinder. A second lead screw is disposed at least partially within the bore of the first lead screw with at least a portion of an outer surface of the second lead screw having threads that engage the threads within the bore of the first lead screw.

7 Claims, 17 Drawing Sheets

(56) References Cited

U.S. PATENT DOCUMENTS

| | | | |
|---|---|---|---|
| 2004/0138030 A1* | 7/2004 | Wang et al. | 482/54 |
| 2004/0171465 A1* | 9/2004 | Hald et al. | 482/54 |
| 2005/0239607 A1* | 10/2005 | Chang | 482/54 |
| 2007/0137331 A1* | 6/2007 | Kachouh | 74/89.23 |
| 2009/0137367 A1* | 5/2009 | Hendrickson | A63B 21/0051 482/54 |
| 2009/0158871 A1* | 6/2009 | Chuo | 74/89.35 |
| 2010/0192715 A1* | 8/2010 | Vauchel et al. | 74/89.35 |
| 2011/0056328 A1* | 3/2011 | Ko | 74/606 R |

* cited by examiner

EXERCISE DEVICE WITH INCLINATION ADJUSTING MECHANISM

RELATED U.S. APPLICATIONS

This application claims priority from U.S. provisional application No. 61/506,776 filed on Jul. 12, 2011.

TECHNICAL FIELD

This invention relates generally to systems, methods, and devices for exercise. More particularly, the invention relates to a motorized system used to increase and decrease the inclination of an exercise device.

BACKGROUND

Inclining exercise devices, such as treadmills, have become very popular for use in improving individuals' health and fitness. Exercising on an inclined exercise device often requires more exertion than exercising on a flat surface or a non-inclined exercise device, thereby providing a more intense, challenging workout.

Inclining exercise devices often include a lift mechanism such as a lift motor for inclining a portion of the exercise device. One common challenge with exercise device lift motors is making the lift motor compact enough to accommodate the aesthetic and space limitations desirable for exercise devices while also providing enough lifting force demanded by such exercise devices. Examples of various exercise device lift mechanisms are described in U.S. Pat. No. 4,729,558, U.S. Pat. No. 5,816,981, U.S. Pat. No. 6,761,667, U.S. Pat. No. 6,913,563, U.S. Pat. No. 6,926,644, U.S. Pat. No. 7,041,038, U.S. Pat. No. 7,285,075, U.S. Pat. No. 7,537,549, and U.S. Pat. No. 7,862,483.

SUMMARY OF THE INVENTION

In one aspect of the disclosure, a telescoping extension device includes a lead cylinder having a bore extending at least partially therethrough.

In another aspect that may be combined with any of the aspects herein, at least a portion of the bore is threaded.

In another aspect that may be combined with any of the aspects herein, the telescoping extension device includes a first lead screw disposed at least partially within the bore of the lead cylinder.

In another aspect that may be combined with any of the aspects herein, at least a portion of an outer surface of the first lead screw has threads that engage the threads within the bore of the lead cylinder.

In another aspect that may be combined with any of the aspects herein, relative rotation between the lead cylinder and the first lead screw causes the first lead screw to move further into or out of the bore of the lead cylinder.

In another aspect that may be combined with any of the aspects herein, the first lead screw has a bore extending at least partially therethrough with at least a portion of the bore being threaded.

In another aspect that may be combined with any of the aspects herein, the telescoping extension device includes a second lead screw disposed at least partially within the bore of the first lead screw.

In another aspect that may be combined with any of the aspects herein, at least a portion of an outer surface of the second lead screw has threads that engage the threads within the bore of the first lead screw.

In another aspect that may be combined with any of the aspects herein, relative rotation between the first lead screw and the second lead screw causes the second lead screw to move further into or out of the bore of the first lead screw.

In another aspect that may be combined with any of the aspects herein, the first lead screw moves further into and out of the bore in the lead cylinder between a fully retracted position and a fully extended position.

In another aspect that may be combined with any of the aspects herein, the second lead screw moves further into and out of the bore in the first lead screw between a fully retracted position and a fully extended position.

In another aspect that may be combined with any of the aspects herein, the telescoping extension device includes a motor, with the lead cylinder rotatably mounted on the motor.

In another aspect that may be combined with any of the aspects herein, the first and second lead screws move linearly relative to the motor.

In another aspect that may be combined with any of the aspects herein, the telescoping extension device includes a first stop member disposed between the lead cylinder and the first lead screw.

In another aspect that may be combined with any of the aspects herein, the telescoping extension device includes a second stop member disposed between the first lead screw and the second lead screw.

In another aspect that may be combined with any of the aspects herein, the first lead screw and the second lead screw are disposed substantially entirely within the bore of the lead cylinder when the first lead screw and the second lead screw are in the fully retracted positions.

In another aspect that may be combined with any of the aspects herein, the telescoping extension device includes a motor, with the second lead screw rotatably mounted on the motor.

In another aspect that may be combined with any of the aspects herein, the first lead screw and the lead cylinder move linearly relative to the motor In another aspect that may be combined with any of the aspects herein, a selectively inclining treadmill supports a user ambulating thereon and includes a support base, a treadbase, and an extension device.

In another aspect that may be combined with any of the aspects herein, the treadbase is pivotally connected to the support base.

In another aspect that may be combined with any of the aspects herein, the treadbase is selectively movable between a declined position, a neutral position, and an inclined position relative to the support base.

In another aspect that may be combined with any of the aspects herein, the extension device selectively moves the treadbase relative to the support base.

In another aspect that may be combined with any of the aspects herein, the extension device has a first end connected to the support base and a second end connected to the treadbase.

In another aspect that may be combined with any of the aspects herein, the extension device includes a motor and at least three telescoping members that retract and expand to enable the treadbase to decline to about a −5% grade and incline to about a 30% grade relative to the support base.

In another aspect that may be combined with any of the aspects herein, the at least three telescoping members include a lead cylinder having a bore extending at least partially therethrough, at least a portion of the bore being threaded.

In another aspect that may be combined with any of the aspects herein, the lead cylinder is rotatably mounted on the motor.

In another aspect that may be combined with any of the aspects herein, the lead cylinder moves substantially linearly closer to and further away from the motor.

In another aspect that may be combined with any of the aspects herein, the at least three telescoping members include a first lead screw disposed at least partially within the bore of the lead cylinder.

In another aspect that may be combined with any of the aspects herein, at least a portion of an outer surface of the first lead screw has threads that engage the threads within the bore of the lead cylinder.

In another aspect that may be combined with any of the aspects herein, relative rotation between the lead cylinder and the first lead screw causes the first lead screw to move further into or out of the bore of the lead cylinder.

In another aspect that may be combined with any of the aspects herein, the first lead screw is movable both rotationally relative to the motor and linearly closer to and further away from the motor.

In another aspect that may be combined with any of the aspects herein, the first lead screw includes a bore extending at least partially therethrough with at least a portion of the bore being threaded.

In another aspect that may be combined with any of the aspects herein, the at least three telescoping members include a second lead screw disposed at least partially within the bore of the first lead screw.

In another aspect that may be combined with any of the aspects herein, at least a portion of an outer surface of the second lead screw has threads that engage the threads within the bore of the first lead screw.

In another aspect that may be combined with any of the aspects herein, relative rotation between the first lead screw and the second lead screw causes the second lead screw to move further into or out of the bore of the first lead screw.

In another aspect that may be combined with any of the aspects herein, the second lead screw is rotatably mounted on the motor.

In another aspect that may be combined with any of the aspects herein, the second lead screw moves substantially linearly closer to and further away from the motor.

In another aspect that may be combined with any of the aspects herein, at least two of the at least three telescoping members rotate relative to the motor and at least two of the at least three telescoping members move linearly relative to the motor.

In another aspect that may be combined with any of the aspects herein, the at least three telescoping members include a first member mounted on the motor, the first member being rotatable by the motor, a second member that is movable both linearly and rotationally relative to the motor, and a third member that is movable linearly relative to the motor.

In another aspect that may be combined with any of the aspects herein, the second and third members move linearly relative to the motor between retracted positions and expanded positions.

In another aspect that may be combined with any of the aspects herein, the second and third members are further away from the motor in the expanded positions than in the retracted positions.

In another aspect that may be combined with any of the aspects herein, the second member is a lead screw that is both internally and externally threaded.

DETAILED DESCRIPTION

Figure 1:
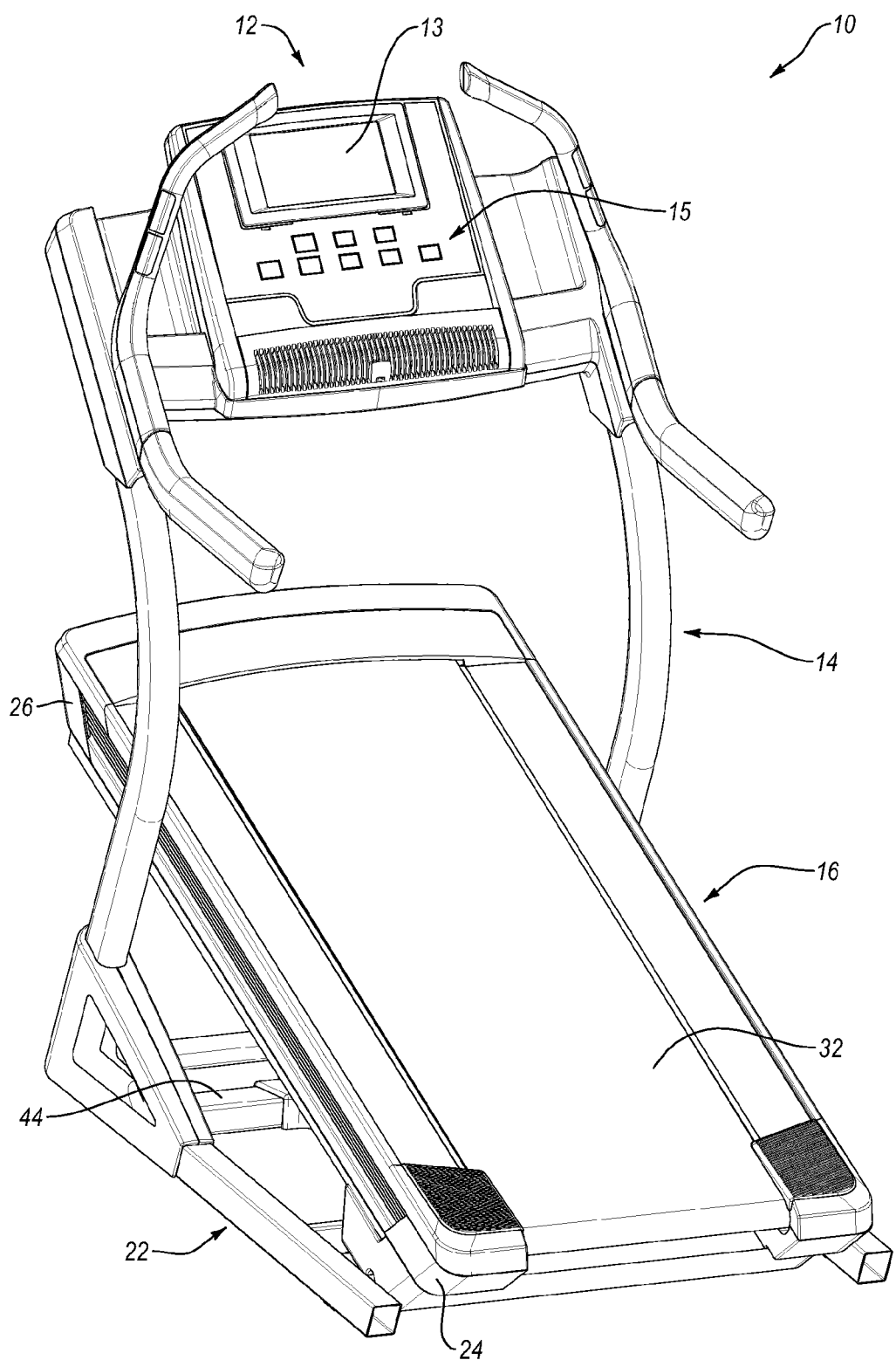
FIG. 1 illustrates an exercise device according to one embodiment of the present invention.
Figure 2:
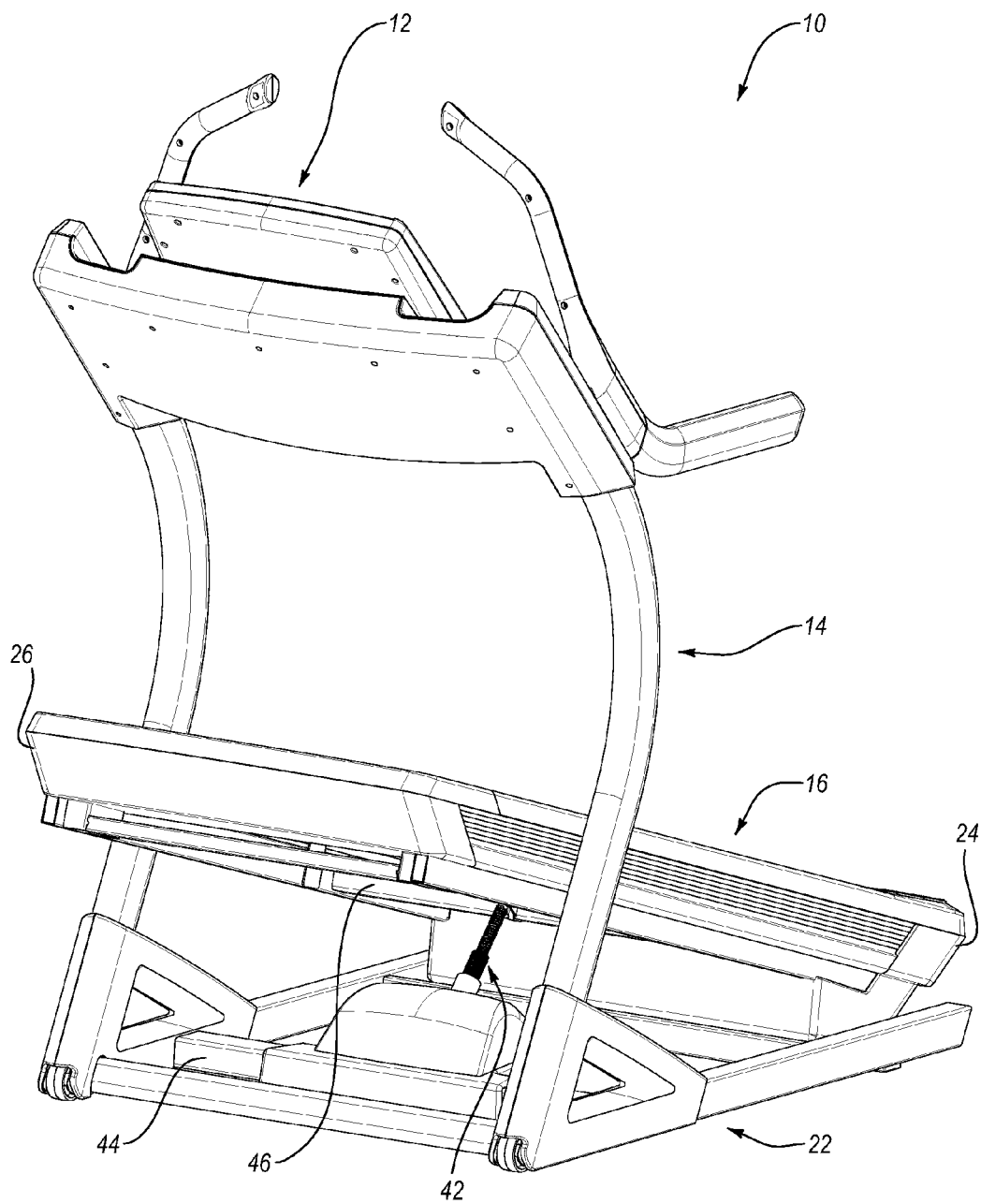
FIG. 2 illustrates a perspective view of the exercise device of FIG. 1 showing an extension device.

Depicted in FIGS. 1 and 2 is a representation of one illustrative exercise device 10. Exercise device 10, which is illustrated as a treadmill, in one embodiment, includes a console or control panel 12 having a display 13 and various inputs 15. Control panel 12 is supported on a generally upright support structure 14. A treadbase 16 is mounted on base frame 22 and typically includes a front and rear pulleys 28, 30 with a continuous belt 32 extending between and around front and rear pulleys 28, 30, respectively. Front and rear pulleys 28, 30 and continuous belt 32 may each be considered a movable element that is movable during the performance of an exercise. A deck 34, commonly fabricated from wood, typically supports the upper run of belt 32 and an exercising individual positioned upon belt 32.

As is common with electric treadmills, at least one of front pulley 28 and rear pulley 30 may be mechanically connected to an electric drive motor 36 by way of a drive belt 38. Optional motor 36 is optionally electrically connected to a controller 40 that controls the operation of motor 36, and thus the speed of belt 32, in response to various user inputs or other control signals.

In addition to the ability to control and vary the speed of belt 32, exercise device 10 also permits the degree of incline or decline of treadbase 16 and belt 32 to be varied relative to base frame 22, or the floor or other support surface upon which exercise device 10 rests. To facilitate various inclines and declines of treadbase 16, treadbase 16 may be pivotally connected to base frame 22. As shown in FIG. 1, for example, a first end 24 of treadbase 16 is pivotally connected to base frame 22 to allow a second end 26 of treadbase 16 to pivot thereabout to increase or decrease the incline of treadbase 16 relative to base frame 22 or the support surface.

As shown in FIG. 2, exercise device 10 includes an extension device 42 connected between treadbase 16 and base frame 22. In the illustrated embodiment, for example, extension device 42 is connected between a cross bar 44 on base frame 22 and a cross bar 46 on treadbase 16. Extension device 42 may move between retracted and extended positions to adjust the incline or decline of treadbase 16. More specifically, extension device 42 may move between a fully retracted position, a fully extended position, and one or more intermediate positions therebetween.

Figure 3:
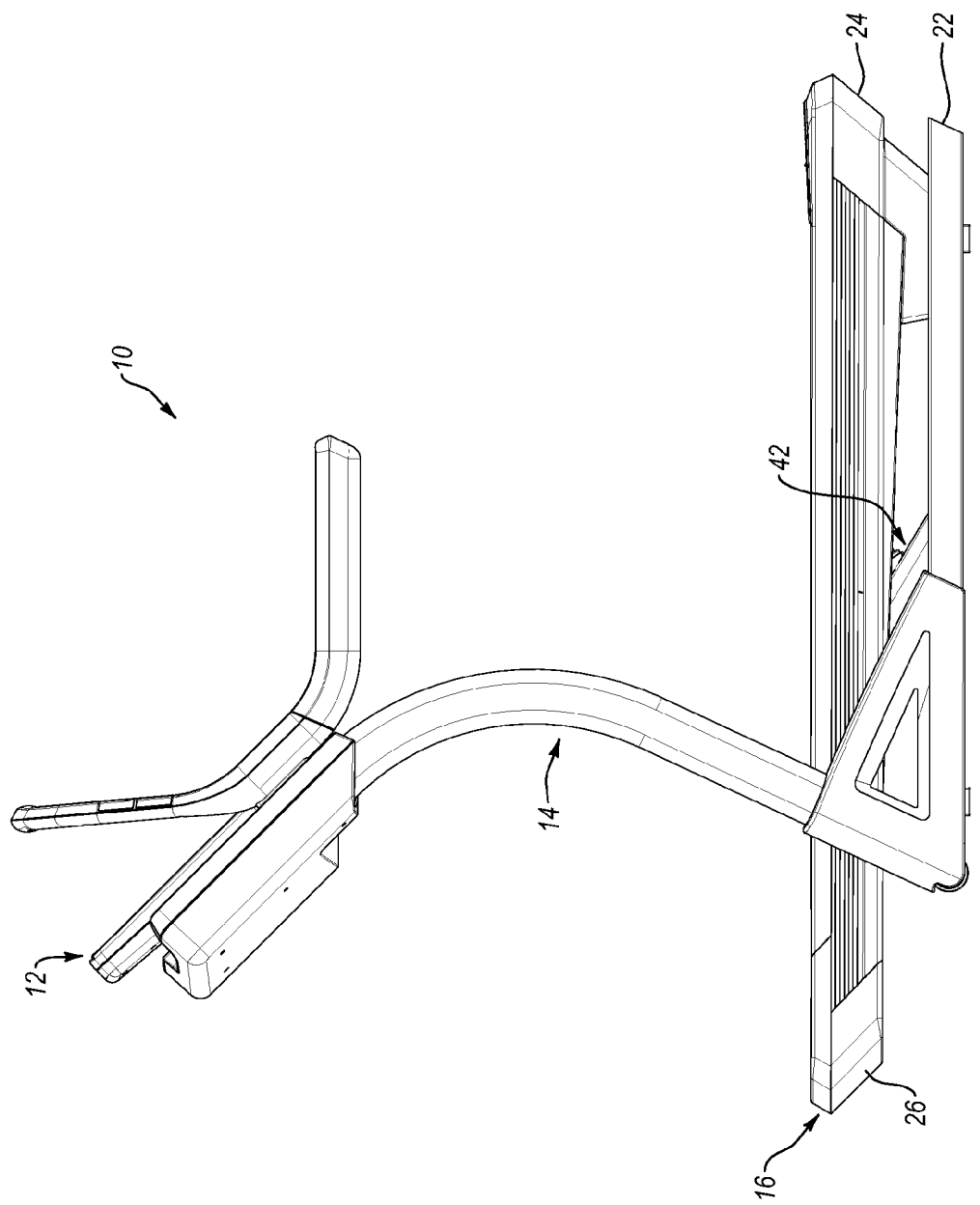
FIG. 3 illustrates a side elevation view of the exercise device of FIG. 1 with the exercise device in a neutral position.

For instance, extension device 42 may move to an intermediate position that orients treadbase 16 is a neutral position as shown in FIG. 3. When in the neutral position, treadbase 16 may be generally parallel to base frame 22 and/or a support surface upon which exercise device 10 rests. In other words, extension device 42 may move to an intermediate position that causes treadbase 16 to pivot or rotate so that first and second ends 24, 26 are generally level with one another. When treadbase 16 is in the neutral position, treadbase 16 replicates a generally flat, level surface for a user ambulating on exercise device 10.

Figure 4:
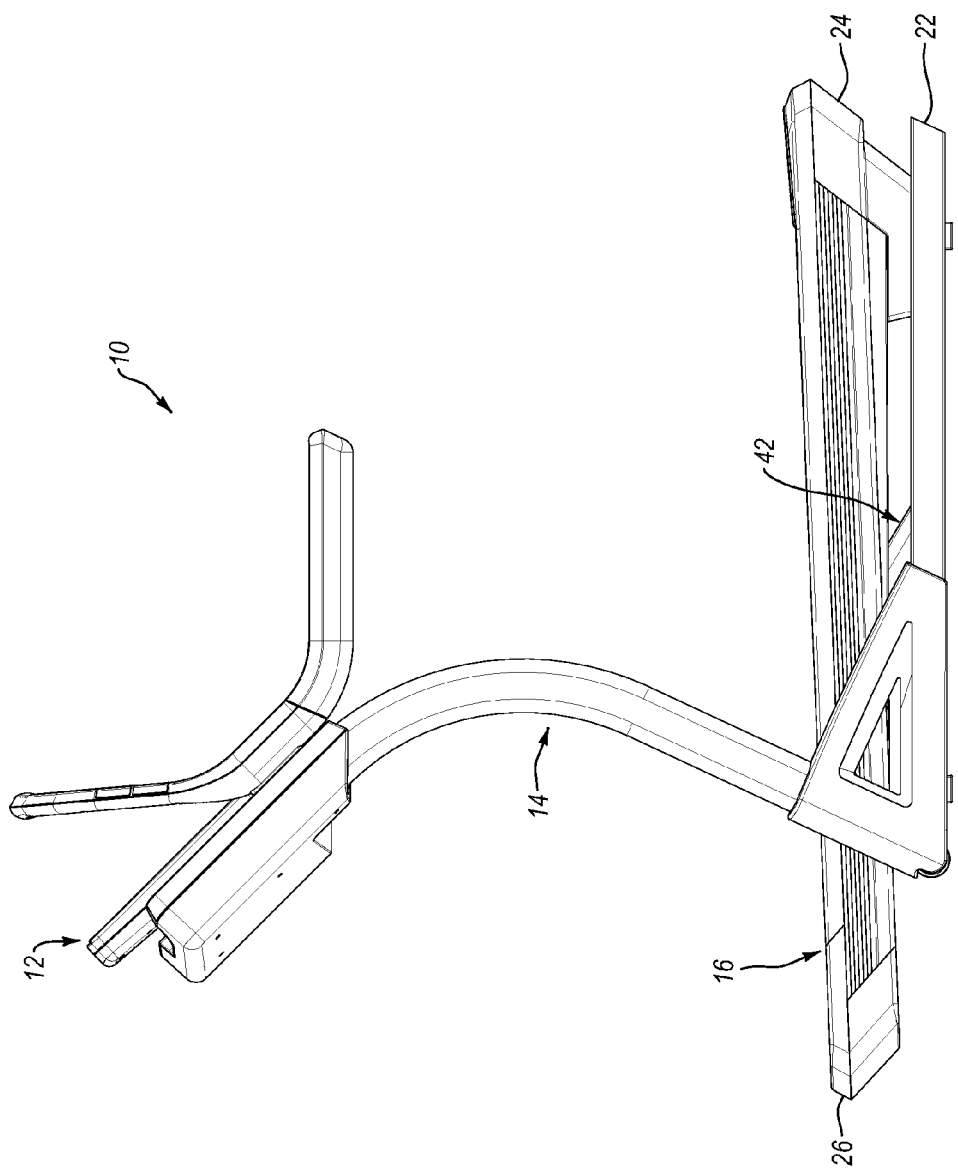
FIG. 4 illustrates a side elevation view of the exercise device of FIG. 1 with the exercise device in a declined position.

When extension device 42 is in the fully retracted position, treadbase 16 may be in a fully declined position as shown in FIG. 4. In the fully declined position, second end 26 of treadbase 16 may be positioned vertically lower than first end 24 of treadbase 16. A declined position of treadbase 16 replicates for a user the experience of ambulating down a hill.

Figure 5:
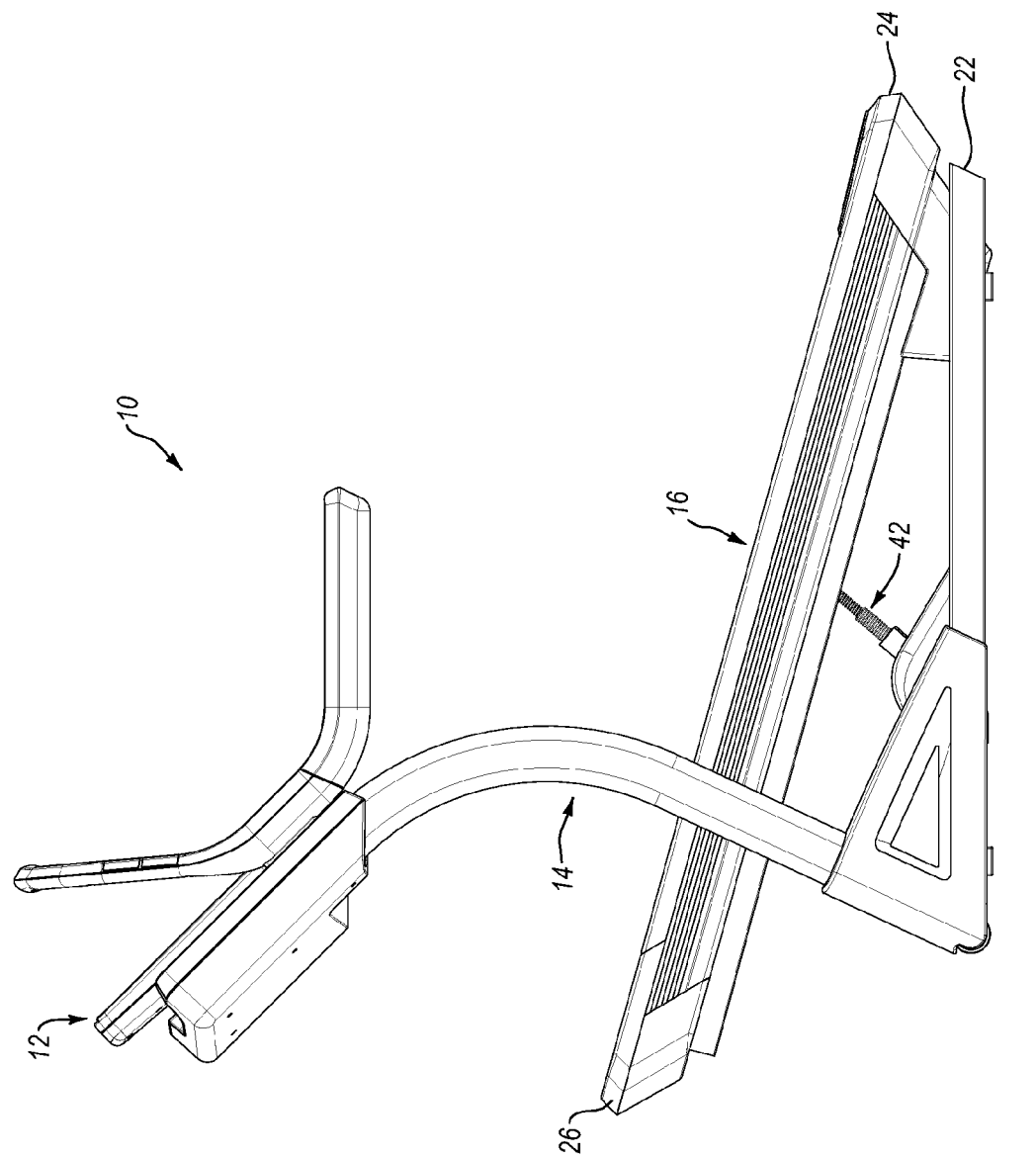
FIG. 5 illustrates a side elevation view of the exercise device of FIG. 1 with the exercise device in an inclined position.

As shown in FIG. 5, treadbase 16 may be moved to a fully inclined position by extending extension device 42 to a fully extended position. In the fully inclined position, second end 26 of treadbase 16 may be positioned vertically higher than first end 24 of treadbase 16. An inclined position of treadbase 16 replicates for a user the experience of ambulating up a hill.

Figure 6A:
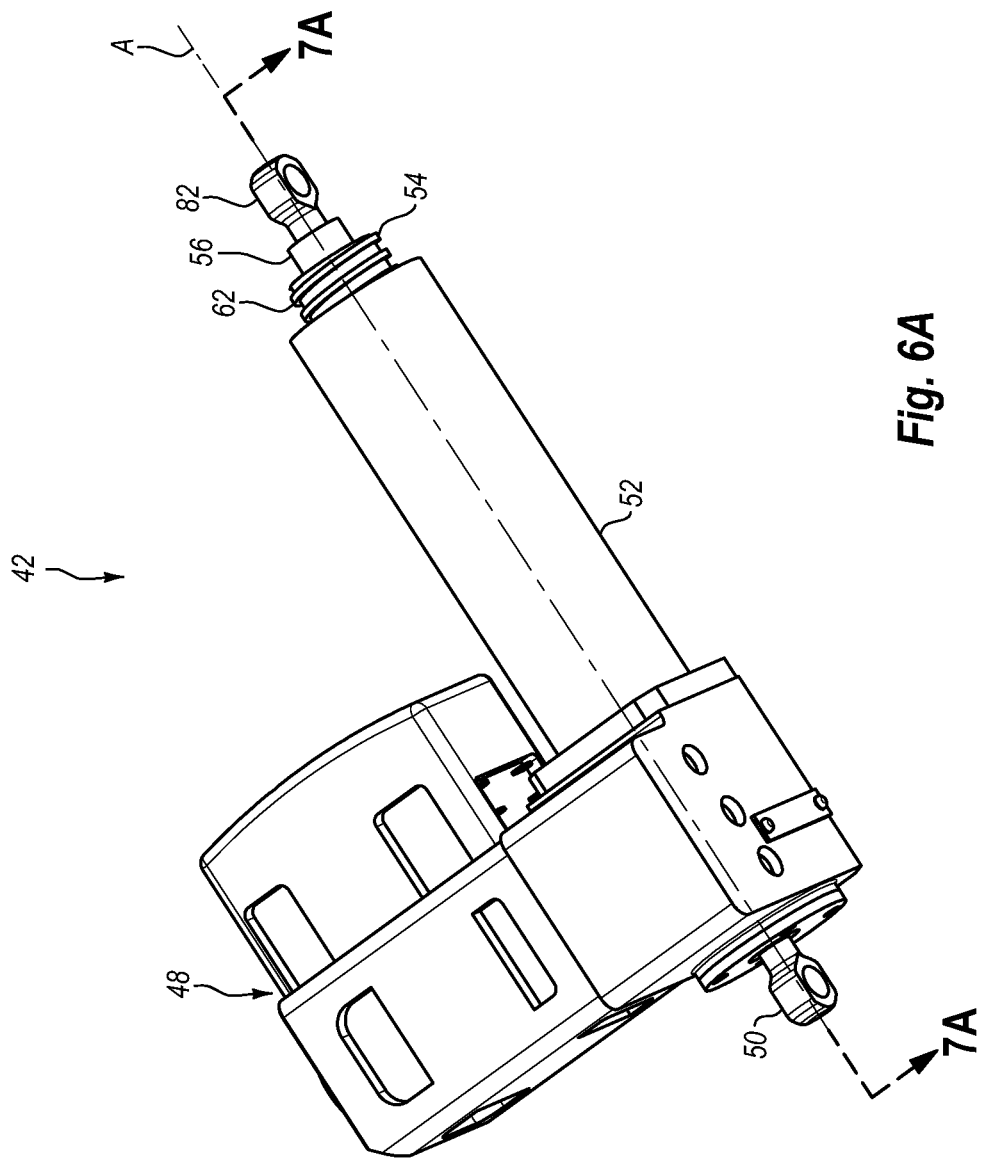
FIGS. 6A-6C illustrate perspective views of one embodiment of an extension device in a fully retracted position, an intermediate extended position, and a fully extended position, respectively.
Figure 6B:
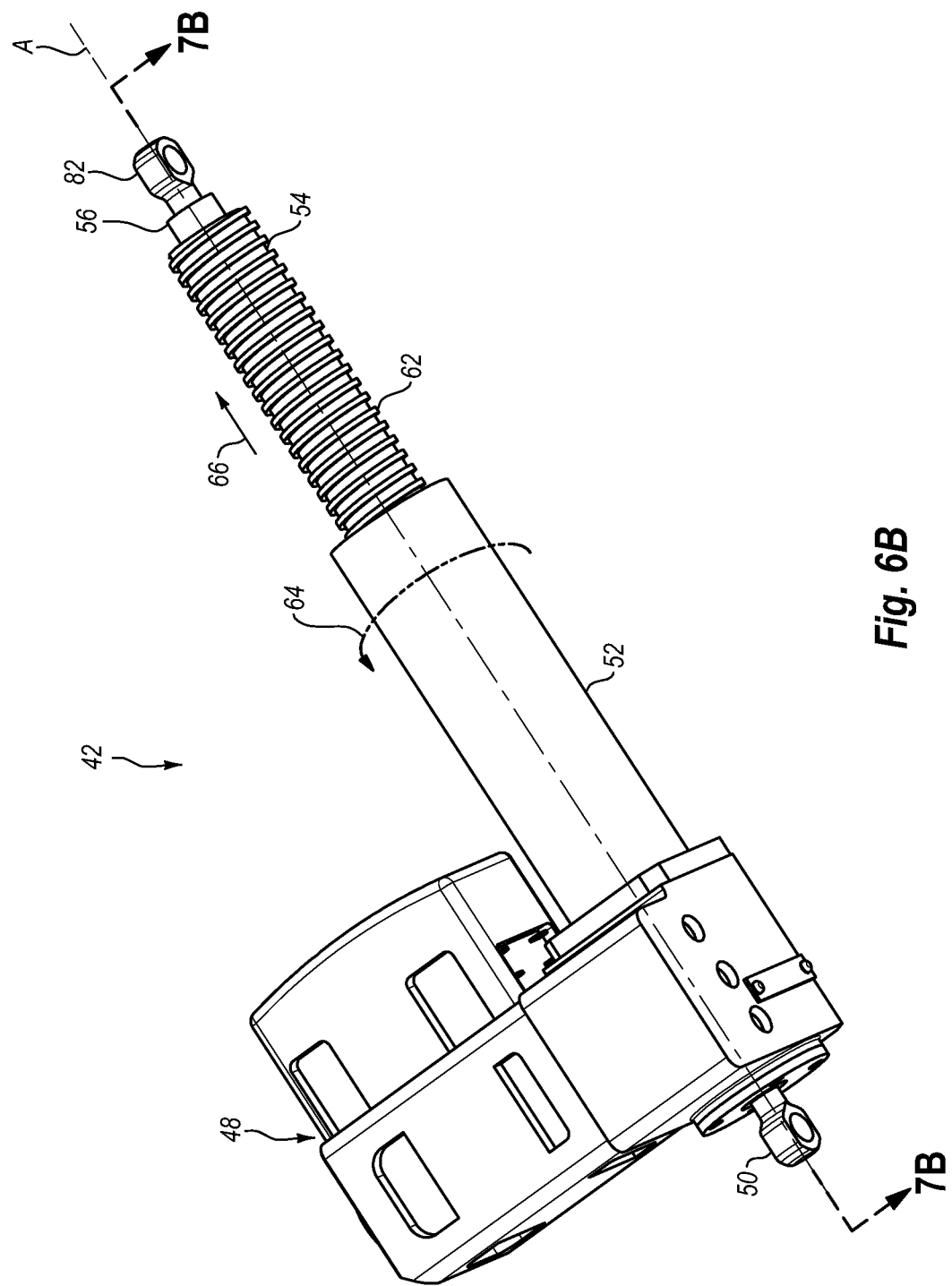
Figure 6C:
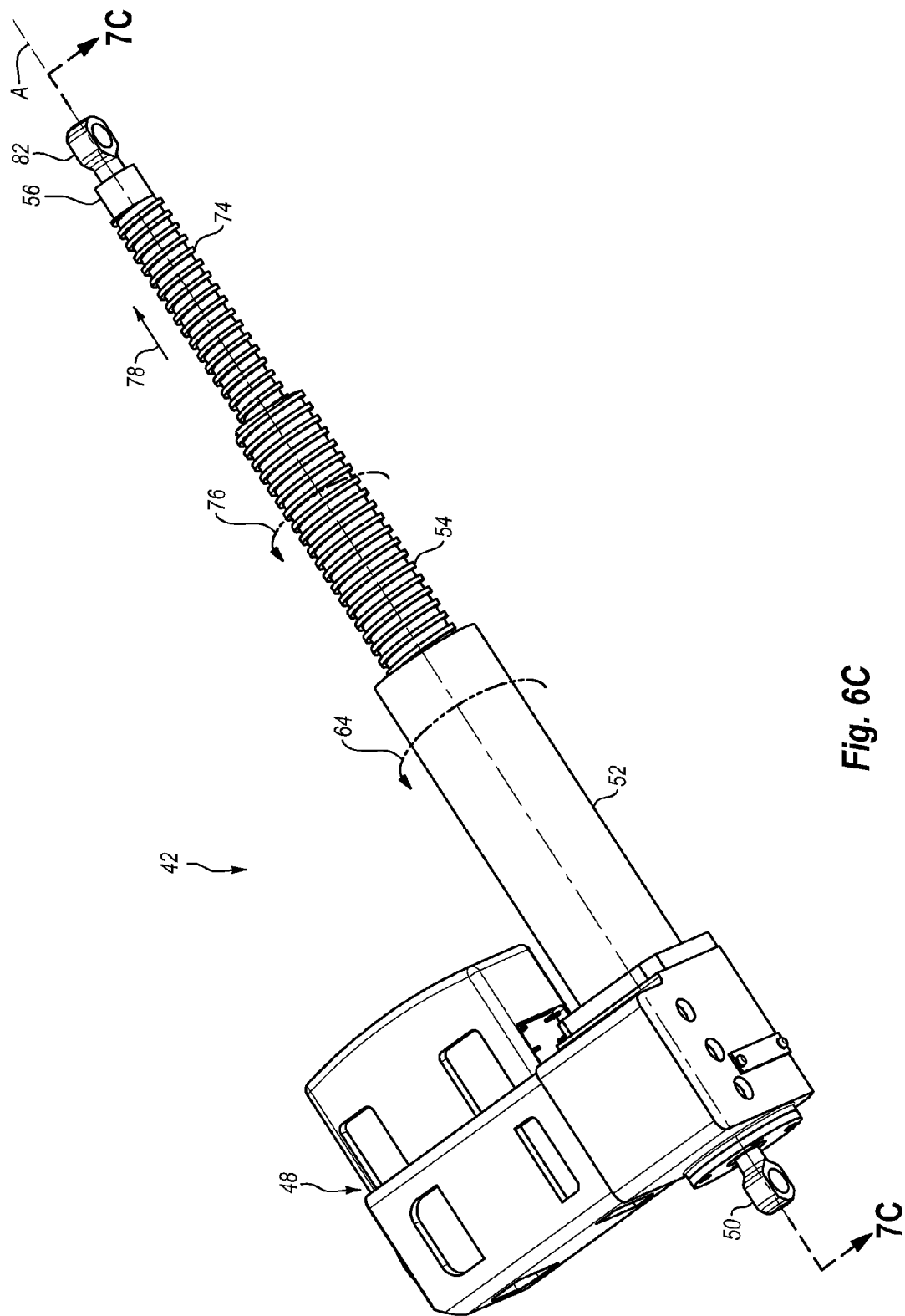
Figure 7A:
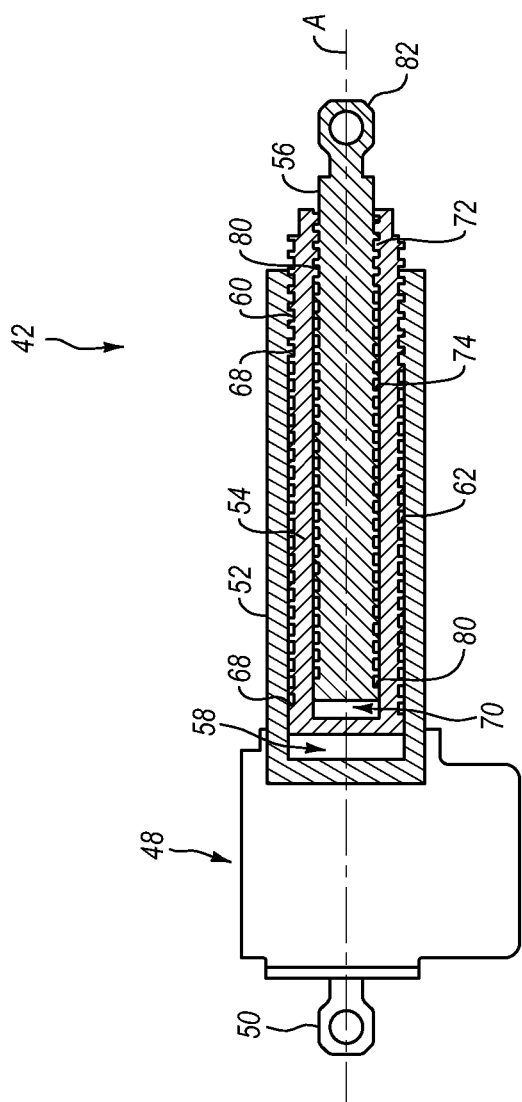
FIGS. 7A-7C illustrate partial cross-sectional views of the extension device of FIGS. 6A-6C in the fully retracted, intermediate extended, and fully extended positions.
Figure 7B:
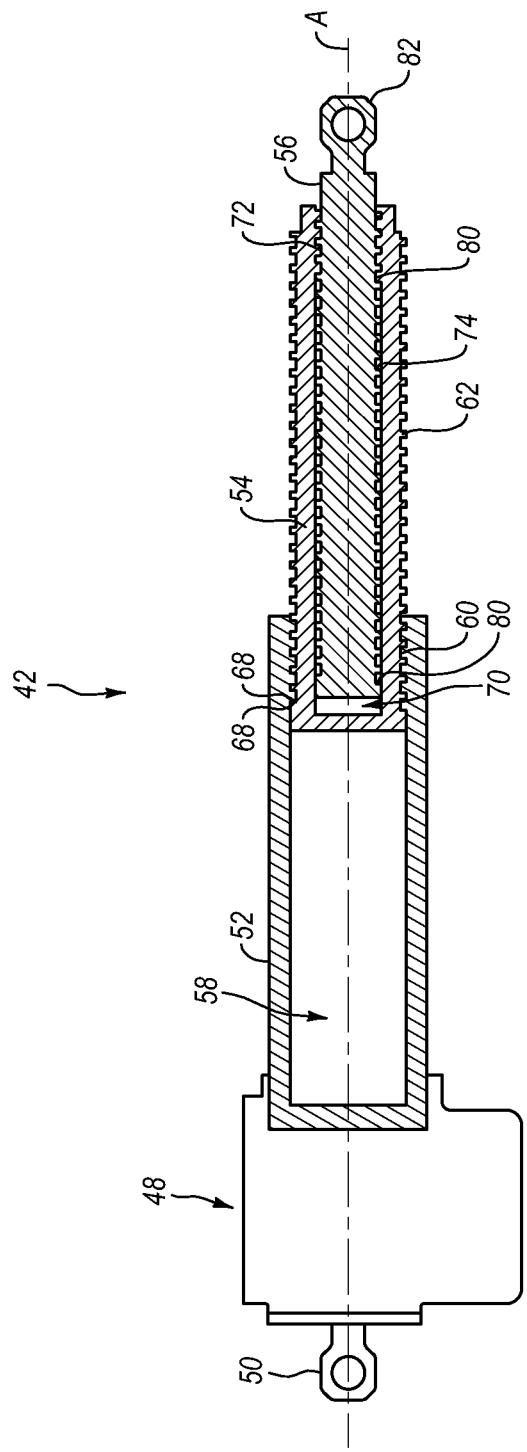
Figure 7C:
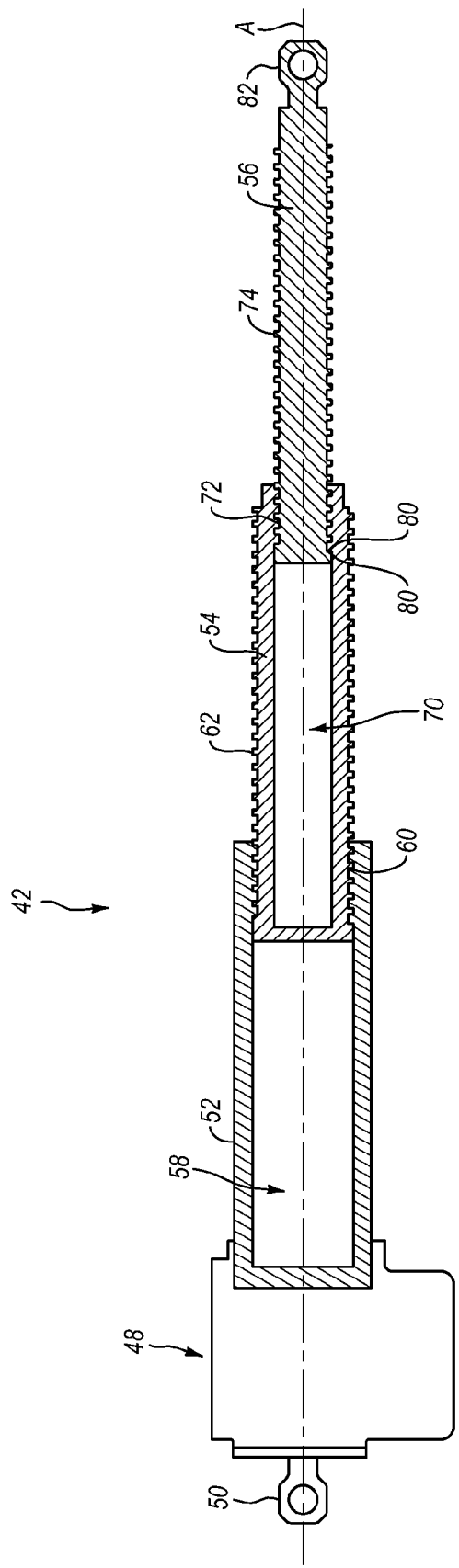

In addition to the ability of the extension device 42 to extend and retract to move treadbase 16 between fully declined, neutral, and fully inclined positions, extension device 42 may also move treadbase 16 to substantially any position between the fully declined and fully inclined positions. According to one embodiment, extension device 42 enables treadbase 16 to be moved to substantially any grade between about a −5% grade in the fully declined position to about a 30% grade in the fully inclined position. It is understood that other embodiments of extension device 42 may enable treadbase 16 to move between grades less than −5% and greater than 30%, or between grades that are less extreme than −5% and 30%. For instance, extension device 42 may enable treadbase 16 to decline to about a −20% grade and incline to about a 45% grade. In still other embodiments, extension device 42 may enable the incline of treadbase 16 to be adjust between grades of between about −15% to 35%, about −10% to 40%, about 0% to 50%, or about −10% to 25%, Attention is now directed to FIGS. 6A-7C, which illustrate perspective and cross-sectional views of extension device 42 separate from exercise device 10. More specifically, FIGS. 6A and 7A illustrate perspective and cross-sectional views, respectively, of extension device 42 in a retracted position. FIGS. 6B and 7B illustrate perspective and cross-sectional views, respectively, of extension device 42 in an intermediate position. FIGS. 6C and 7C illustrate perspective and cross-sectional views, respectively, of extension device 42 in an extended position.

As seen in the Figures, extension device 42 includes an extension motor 48 with a fitting 50 connected thereto. Extension device 42 may be connected to cross bar 44 on base frame 22 via fitting 50 such that extension device 42 may pivot or rotate relative to cross bar 44. For instance, fitting 50 may allow extension device 42 to pivot or rotate about an axis that is generally parallel to a longitudinal axis of cross bar 44 as extension device 42 moves between retracted and extended positions.

Extension device 42 also includes a plurality of telescoping extension members that cooperate to move extension device 42 between the retracted and extended positions. In the illustrated embodiment, the plurality of telescoping extension members includes a lead cylinder 52, a first lead screw 54, and a second lead screw 56. A first end of lead cylinder 52 is rotatably mounted on extension motor 48 such that extension motor 48 is able to rotate lead cylinder 52 about axis A. In the illustrated embodiment, axis A is generally collinear with longitudinal axes of lead cylinder 52, first lead screw 54, and second lead screw 56.

As seen in FIGS. 7A-7C, lead cylinder 52 includes a bore 58 extending at least partially through the length thereof. A second end of lead cylinder 52 is open to provide access to bore 58. Additionally, at least a portion of bore 58 includes threads 60. In the illustrated embodiment, only the portion of bore 58 adjacent the second end of lead cylinder 52 includes threads 60.

Bore 58 is sized and configured to receive at least a portion of first and second lead screws 54, 56 therein, as shown in FIGS. 6A and 7A. First lead screw 54 includes threads 62 on an outer surface thereof. Threads 62 cooperate with threads 60 within bore 58 to move first lead screw 54 further into or out of bore 58. More specifically, rotation of lead cylinder 52, and thus threads 60, relative to first lead screw 54 causes threads 60 to drive first lead screw 54 into or out of bore 58. For instance, as shown in FIG. 6B, when lead cylinder 52 is rotated in the direction of arrow 64, first lead screw 54 is driven out of bore 58 in the generally linear direction indicated by arrow 66 to an extended position. Conversely, when lead cylinder 52 is rotated in the direction opposite to arrow 64, first lead screw 54 is drawn generally linearly into bore 58 to a more retracted position.

One or more stop members 68 may be disposed between lead cylinder 52 and first lead screw 54 to limit the rotational and/or linear movement of first lead screw 54 relative to lead cylinder 52. For instance, one or both of lead cylinder 52 and first lead screw 54 may include a ridge or other protrusion that engages a portion of the other member to prevent further relative rotational and/or linear movement between first lead screw 54 and lead cylinder 52. In some embodiments, engagement between stop members 68 on lead cylinder 52 and first lead screw 54, as shown for example in FIG. 7B, causes first lead screw 54 to rotate with lead cylinder 52. As a result, lead cylinder 52 may rotate relative to extension motor 48, and first lead screw 54 may rotate and move linearly relative to both extension motor 48 and lead cylinder 52. First lead screw 54 may also rotate with lead cylinder 52.

Similar to lead cylinder 52 and as seen in FIGS. 7A-7C, first lead screw 54 includes a bore 70 extending at least partially through the length thereof. A second end of first lead screw 54 is open to provide access to bore 70. Additionally, at least a portion of bore 70 includes threads 72. In the illustrated embodiment, only the portion of bore 70 adjacent the second end of first lead screw 54 includes threads 72.

Bore 70 is sized and configured to receive at least a portion of second lead screw 56 therein, as shown in FIGS. 6A, 6B, 7A, and 7B. Second lead screw 56 includes threads 74 on an outer surface thereof. Threads 74 cooperate with threads 72 within bore 70 to move second lead screw 56 further into or out of bore 70. More specifically, rotation of first lead screw 54, and thus threads 72, relative to second lead screw 56 causes threads 72 to drive second lead screw 56 into or out of bore 70. For instance, as shown in FIG. 6C, when first lead screw 54 is rotated in the direction of arrow 76, second lead screw 56 is driven out of bore 70 in the generally linear direction indicated by arrow 78 to an extended position. Conversely, when first lead screw 54 is rotated in the direction opposite to arrow 76, second lead screw 56 is drawn generally linearly into bore 70 to a more retracted position.

One or more stop members 80 may be disposed between first lead screw 54 and second lead screw 56 to limit the rotational and/or linear movement of second lead screw 56 relative to first lead screw 54. For instance, one or both of first lead screw 54 and second lead screw 56 may include a ridge or other protrusion that engages a portion of the other member to prevent further relative rotational and/or linear movement between second lead screw 56 and first lead screw 54. In some embodiments, engagement between stop members 80 on first lead screw 54 and second lead screw 56, as shown for example in FIG. 7C, causes second lead screw 56 to rotate with first lead screw 54. As a result, second lead screw 56 may rotate and move linearly relative to extension motor 48, lead cylinder 52, and first lead screw 54. Second lead screw 56 may also rotate with firs lead screw 54 and lead cylinder 52 relative to extension motor 48.

As seen in the Figures, second lead screw 56 has a fitting 82 disposed on an end thereof. Extension device 42 may be connected to cross bar 46 on treadbase 16 via fitting 82 such that extension device 42 may pivot or rotate relative to cross bar 46. For instance, fitting 82 may allow extension device 42 to pivot or rotate about an axis that is generally parallel to a longitudinal axis of cross bar 46 as extension device 42 moves between retracted and extended positions.

In the illustrated embodiment, fitting 82 is illustrated as being integrally formed with second lead screw 56. Such a configuration may prevent second lead screw 56 from rotating about axis A. As a result, the movement of second lead screw 56 relative to extension motor 48 may be limited to generally linear movement. In other embodiments, however, fitting 82 may be rotatably disposed on second lead screw 56 to enable second lead screw 56 to move both linearly and rotationally relative to extension motor 48.

Figure 8A:
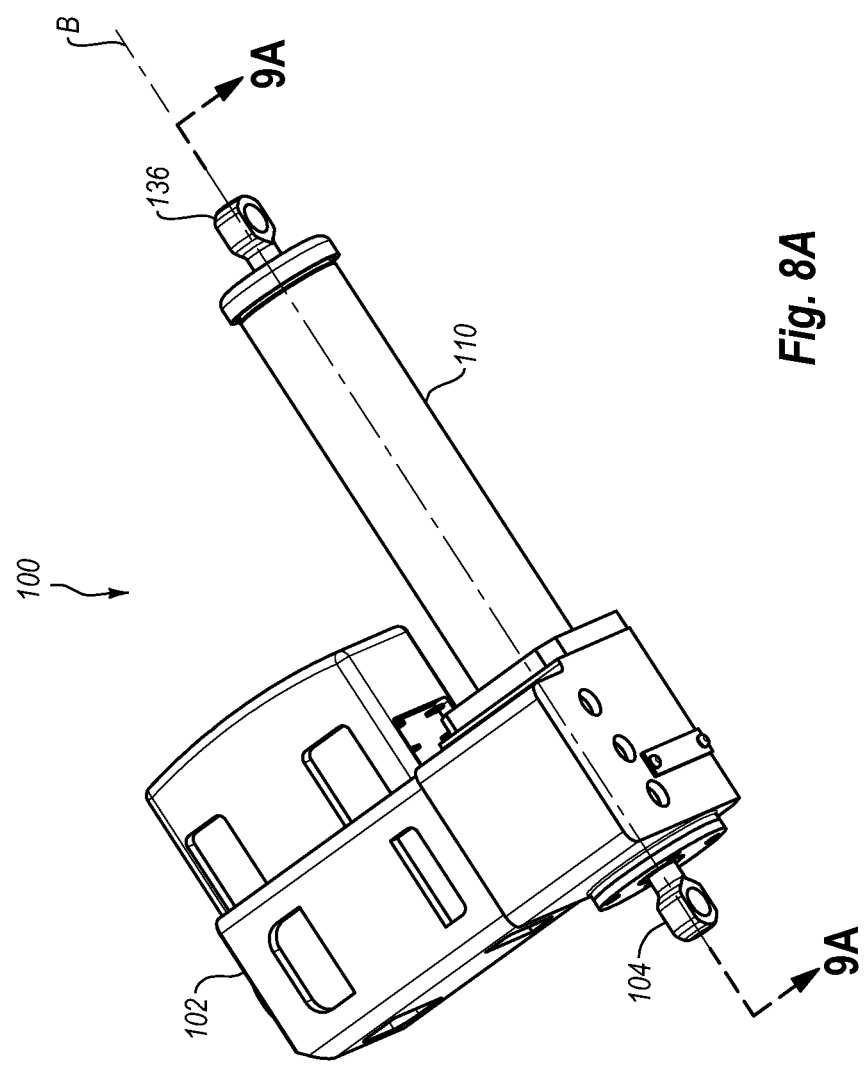
FIGS. 8A-8C illustrate perspective views of another embodiment of an extension device in a fully retracted position, an intermediate extended position, and a fully extended position, respectively.
Figure 8B:
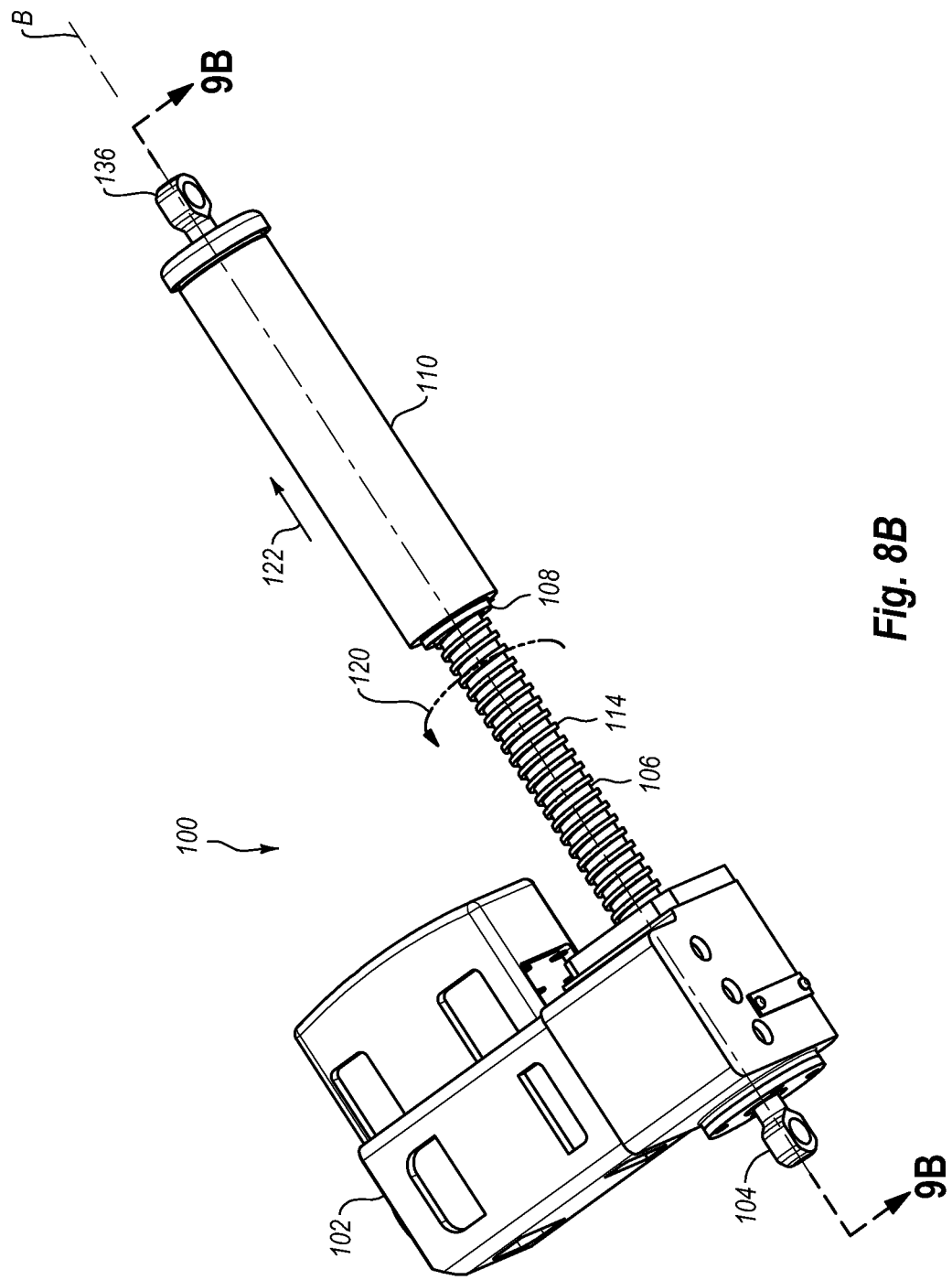
Figure 8C:
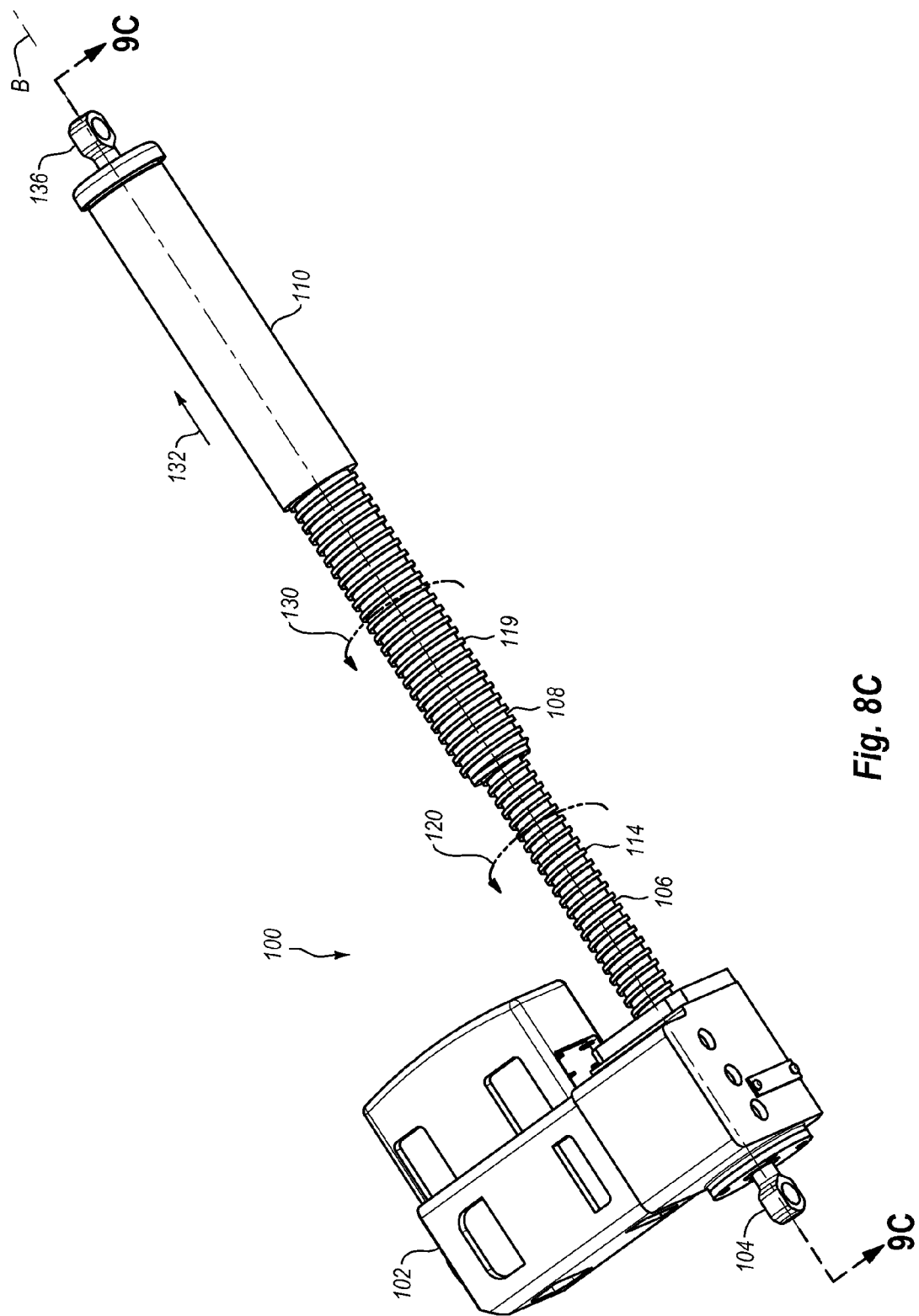
Figure 9A:
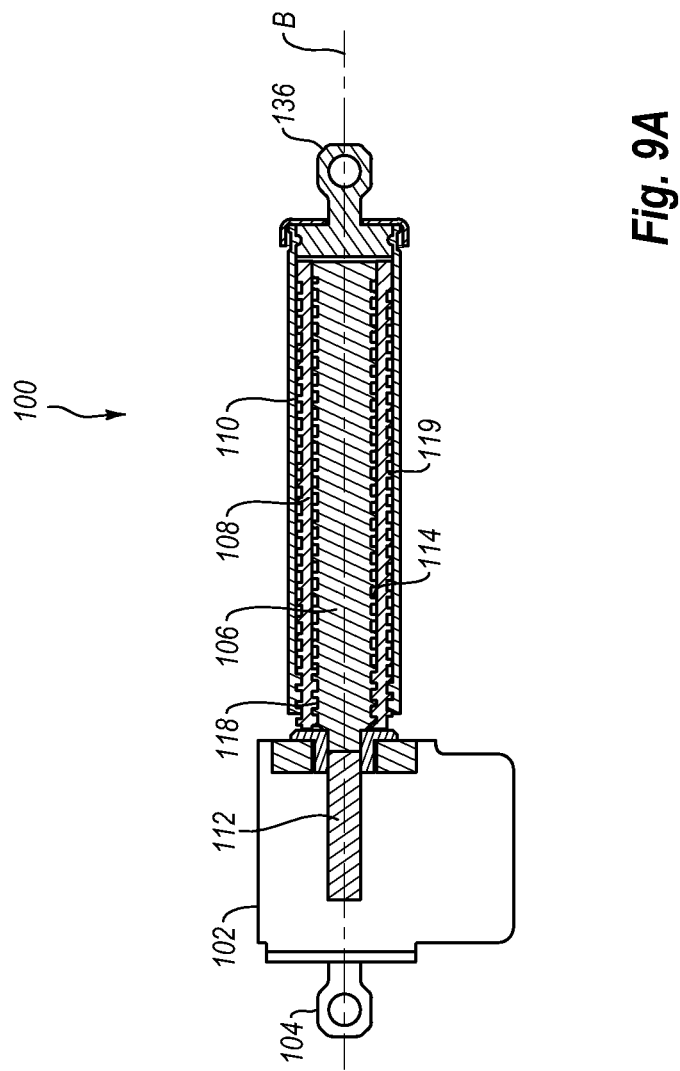
FIGS. 9A-9C illustrate partial cross-sectional views of the extension device of FIGS. 8A-8C in the fully retracted, intermediate extended, and fully extended positions.
Figure 9B:
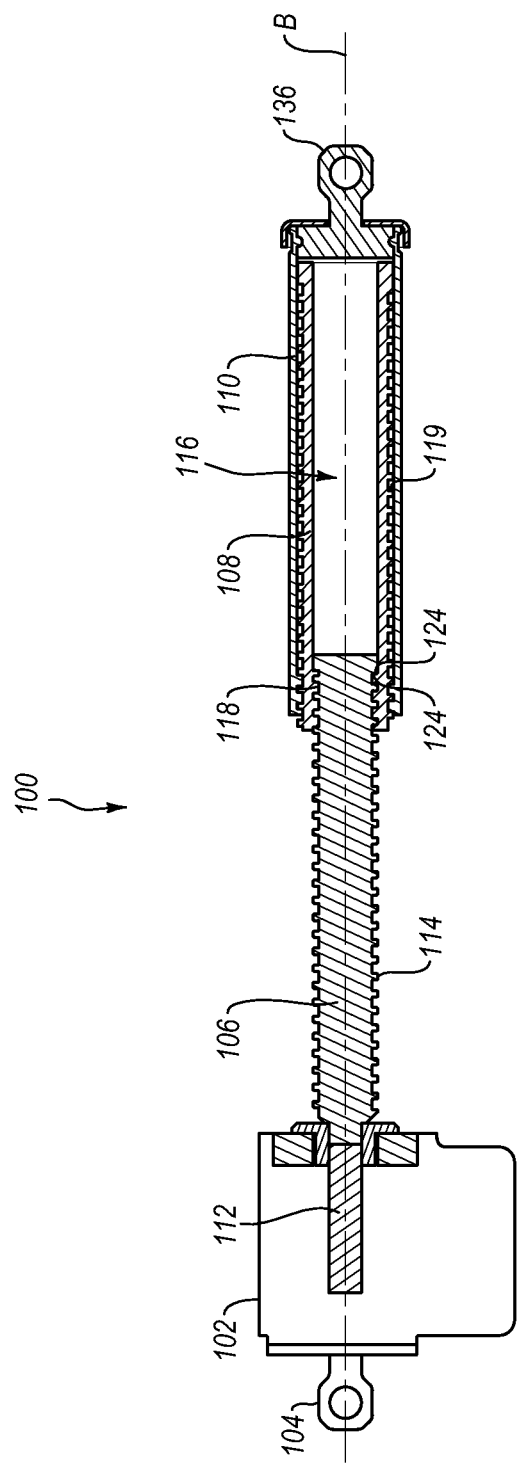
Figure 9C:
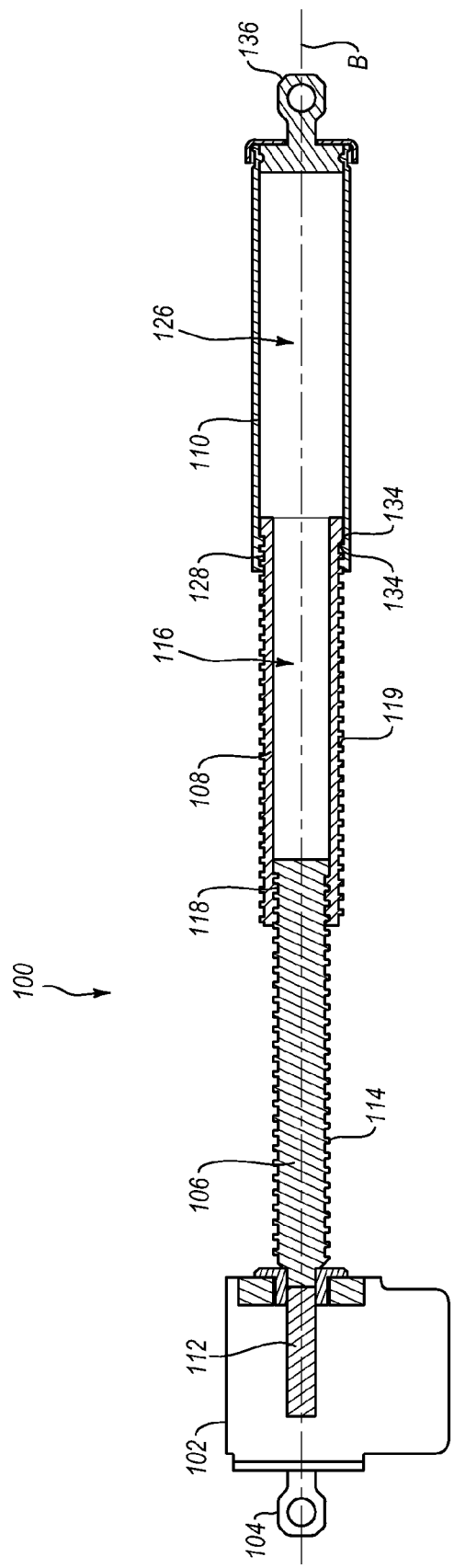

Attention is now directed to FIGS. 8A-9C, which illustrate perspective and cross-sectional views of another embodiment of an extension device 100 that may be used in connection with exercise device 10. More specifically. FIGS. 8A and 9A illustrate perspective and cross-sectional views, respectively, of extension device 100 in a retracted position. FIGS. 8B and 9B illustrate perspective and cross-sectional views, respectively, of extension device 100 in an intermediate position. FIGS. 8C and 9C illustrate perspective and cross-sectional views, respectively, of extension device 100 in an extended position.

As seen in the Figures, extension device 100 includes an extension motor 102 with a fitting 104 connected thereto. Extension device 100 may be connected to cross bar 44 on base frame 22 via fitting 102 such that extension device 100 may pivot or rotate relative to cross bar 44. For instance, fitting 102 may allow extension device 100 to pivot or rotate about an axis that is generally parallel to a longitudinal axis of cross bar 44 as extension device 100 moves between retracted and extended positions.

Like extension device 42, extension device 100 also includes a plurality of telescoping extension members that cooperate to move extension device 100 between retracted and extended positions. It will be understood in light of the following description that the telescoping extension members of extension device 100 may be considered an inverted or reversed form of the telescoping extension members of extension device 42.

In the illustrated embodiment, the plurality of telescoping extension members includes a first lead screw 106, a second lead screw 108, and a lead cylinder 110. A first end of first lead screw 106 is rotatably mounted on extension motor 102 such that extension motor 102 is able to rotate first lead screw 106 about axis B. In the illustrated embodiment, axis B is generally collinear with longitudinal axes of first lead screw 106, second lead screw 108, and lift tube 110. As shown in FIGS. 9A-9C, a drive key 112 may impart a rotational force from extension motor 102 to first lead screw 106 to cause first lead screw 106 to rotate about axis B. Furthermore, as shown in FIGS. 8B-9C, first lead screw 106 has threads 114 on an outer surface thereof.

Second lead screw 108 is movably positioned on first lead screw 106. More specifically, as best seen in FIGS. 9B and 9C, second lead screw 108 includes a bore 116 extending at least partially through the length thereof. A first end of second lead screw 108 is open to provide access to bore 116. Additionally, at least a portion of bore 116 includes threads 118. In the illustrated embodiment, only the portion of bore 116 adjacent the first end of second lead screw 108 includes threads 118. Second lead screw 108 also has threads 119 on an outer surface thereof, as shown in FIGS. 8C-9C.

Bore 116 in second lead screw 108 is sized and configured to receive at least a portion of first lead screw 106 therein, as shown in FIGS. 8A and 9A. Threads 114 on first lead screw 106 cooperate with threads 118 within bore 116 to move second lead screw 108 further on or off of first lead screw 106. More specifically, rotation of first lead screw 106, and thus threads 114, relative to second lead screw 108 causes threads 114 to drive second lead screw 108 further onto or off of first lead screw 106. For instance, as shown in FIG. 8B, when first lead screw 106 is rotated in the direction of arrow 120, second lead screw 108 (and lead cylinder 110) is driven further off of first lead screw 106 in the generally linear direction indicated by arrow 122 to an extended position. Conversely, when first lead screw 106 is rotated in the direction opposite to arrow 120, second lead screw 108 is drawn generally linearly further onto first lead screw 106 to a more retracted position.

As with extension device 42, extension device 100 may include one or more stop members 124 disposed between first lead screw 106 and second lead screw 108 to limit the rotational and/or linear movement of second lead screw 108 relative to first lead screw 106. For instance, one or both of first lead screw 106 and second lead screw 108 may include a ridge or other protrusion that engages a portion of the other member to prevent further relative rotational and/or linear movement between first lead screw 106 and second lead screw 108. In some embodiments, engagement between stop members 124 on first and second lead screws 106, 108, as shown for example in FIG. 9B, causes second lead screw 108 to rotate with first lead screw 108. As a result, first lead screw 106 may rotate relative to extension motor 102, second lead screw 108 may rotate and move linearly relative to both extension motor 102 and first lead screw 106, and second lead screw 108 may also rotate with first lead screw 106.

Similar to second lead screw 108 and as best seen in FIG. 9C, lead cylinder 110 includes a bore 126 extending at least partially through the length thereof. A first end of lead cylinder 110 is open to provide access to bore 126. Additionally, at least a portion of bore 126 includes threads 128. In the illustrated embodiment, only the portion of bore 126 adjacent the first end of lead cylinder includes threads 128.

Bore 126 is sized and configured to receive at least a portion of first and second lead screws 106, 108 therein, as shown in FIGS. 8B, 9A, and 9B. Threads 119 on second lead screw 108 cooperate with threads 128 within bore 126 to move lead cylinder 110 further on or off of second lead screw 108. More specifically, rotation of second lead screw 108, and thus threads 119, relative to lead cylinder 110 causes threads 119 to drive lead cylinder 110 further onto or off of second lead screw 108. For instance, as shown in FIG. 8C, when second lead screw 108 is rotated in the direction of arrow 130, lead cylinder 110 is driven further off of second lead screw 108 in the generally linear direction indicated by arrow 132 to an extended position. Conversely, when second lead screw 108 is rotated in the direction opposite to arrow 130, lead cylinder 110 is drawn generally linearly further onto second lead screw 108 to a more retracted position.

One or more stop members 134 may be disposed between second lead screw 108 and lead cylinder 110 to limit the rotational and/or linear movement of lead cylinder 110 relative to second lead screw 108. For instance, one or both of second lead screw 108 and lead cylinder 110 may include a ridge or other protrusion that engages a portion of the other member to prevent further relative rotational and/or linear movement between second lead screw 108 and lead cylinder 110. In some embodiments, engagement between stop members 134 on second lead screw 108 and lead cylinder 110, as shown for example in FIG. 9C, causes lead cylinder 110 to rotate with second lead screw 108. As a result, lead cylinder 110 may rotate and move linearly relative to extension motor 102, first lead screw 106, and second lead screw 108, as well as rotate with first and/or second lead screws 106, 108.

As seen in the Figures, lead cylinder 110 has a fitting 136 disposed on an end thereof. Extension device 100 may be connected to cross bar 46 on treadbase 16 via fitting 136 such that extension device 100 may pivot or rotate relative to cross bar 46. For instance, fitting 136 may allow extension device 42 to pivot or rotate about an axis that is generally parallel to a longitudinal axis of cross bar 46 as extension device 42 moves between retracted and extended positions.

In the illustrated embodiment, fitting 136 is illustrated as being rotationally mounted on lead cylinder 110 such that lead cylinder 110 may rotate relative to fitting 136 about axis B. Such a configuration may allow lead cylinder 110 to move both linearly and rotationally relative to extension motor 102 and first and second lead screws 106, 108. In other embodiments, however, fitting 136 may be integrally formed with or fixedly connected to lead cylinder 110 to prevent relative movement therebetween. Such a configuration may prevent lead cylinder 110 from rotating about axis B. As a result, the movement of lead cylinder 110 relative to extension motor 102 and first and second lead screws 106, 108 may be limited to generally linear movement.

INDUSTRIAL APPLICABILITY

In general, embodiments of the present disclosure relate to exercise devices that incline and/or decline to provide variety in an exercise workout. The exercise devices may be any type of exercise device, such as a treadmill, an exercise cycle, a Nordic style ski exercise device, a rower, a stepper, a hiker, a climber, an elliptical, or a striding exercise device. The inclining and declining capabilities of the disclosed exercise devices allow the exercise devices to simulate real-world terrain or otherwise vary the operation of the exercise device. For instance, a treadmill may have an extension device that adjusts the angle of the treadbase to simulate a descent down a hill, an ascent up a hill, or traversing across level ground.

While exercise devices have included inclining and declining mechanisms, including extension devices, for adjusting the angle of the exercise devices, these inclining and declining mechanisms have typically been large and aesthetically unappealing. For instance, in order to provide a desirable range of motion for the exercise device, these mechanisms have required relatively long extension members, such as a relatively long lead screw movably positioned within a relatively long lead cylinder. The length of these extension members allowed for the long lead screw to move significant distances into and out of the lead cylinder, thereby allowing for the desired range of motion for the exercise device. Nevertheless, the length of these extension members increased the overall profile of the exercise device. For instance, in order to fit these long extension members under the treadbase of a treadmill, the treadbase would have to be elevated further off the floor.

Embodiments of the present disclosure provide simple and efficient mechanisms for adjusting the incline or decline of an exercise device. The disclosed embodiments are compact, thereby allowing for an aesthetically pleasing, low profile exercise device. For instance, the compact extension devices may fit underneath the treadbase of a treadmill without having to increase the elevation of the treadbase. Additionally, the extension devices allow the exercise devices to be inclined significantly without having to use long, space-consuming extension members. Furthermore, the compact nature of the extension devices allows the exercise device to be significantly declined.

The compact extension devices of the present invention may include an extension motor and at least three telescoping extension members. A first extension member of the at least three telescoping extension members may be rotatably mounted on the extension motor such that the extension motor can rotate the first extension member. Rotation of the first extension member may cause a second extension member to move linearly closer to or further away from the extension motor. The second extension member may move between fully retracted and fully extended positions.

When the second extension member is in the fully extended position, the first extension member may cause the second extension member to rotate with the first extension member. Rotation of the second extension member may cause a third extension member to move linearly closer to or further away from the extension motor. The third extension member may move between fully retracted and fully extended positions.

The extension members may include a lead cylinder and at least two lead screws. The lead screws and lead cylinder may be configured and arrange in various ways. For instance, one lead screw may be rotatably mounted on the extension motor and the other lead screw(s) and the lead cylinder may be received thereon for movement closer to or further away from the extension motor. Alternatively, the lead cylinder may be rotatably mounted on the extension motor and the lead screws may be received therein for movement closer to or further away from the extension motor. In any case, the lead cylinder may include a bore for receiving the lead screws at least partially therein. Similarly, at least one of the lead screws may have a bore therein for receiving the other lead screw(s) therein. In other words, the extension members may be arranged in a telescoping manner.

Using a telescoping arrangement for the at least three extension members provides significant benefits. For instance, the telescoping arrangement allows the at least three extension members to be relatively compact when received within one another. As a result, the extension mechanism can fit underneath an exercise device without requiring a significant increase in the height of the exercise device. Similarly, the compact profile of the telescoped extension members enables the exercise device to be declined to a greater degree without increasing the height of the exercise device. For instance, to provide a treadmill with declining capabilities, the treadbase is typically raised to provide room thereunder for a typical (e.g., large or long) extension device as well as room for the treadbase to pivot down. In contrast, the compact extension devices disclosed herein can fit underneath the treadbase with room for the treadbase to pivot down without having to significantly increase the height of the treadbase.

The telescoping arrangement also allows the at least three extension members to expand from the compact configuration to a relatively large length when extending from one another. This provides the exercise device with a wide range of motion from a relatively small extension device. In one embodiment, for instance, the extension device has a fully retracted length of about 9.5 inches and a fully extended length of about 19 inches. According to this embodiment, the ratio between the extended and retracted lengths of the extension device would be about 2. In other embodiments, the ratio between the extended and retracted lengths may range anywhere from about 1.001 to at least about 4. For instance, the extension device may have a retracted length of about 9 inches and an extended length of about 36 inches, resulting in a ratio of about 4. In still other embodiments, the extension device may have a retracted length of about 10 inches and an extended length of about 30 inches, resulting in a ratio of about 3. In still other embodiments, the retracted length may be about 9.5 inches and the extended length may be about 10.45 inches, resulting in a ratio of about 1.1. Depending on the where the extension device is connected on the exercise device (e.g., on the base frame and the treadbase), such extension devices may allow the grade of the exercise device to change by up to about 65%, such as between a grade of about −20% to about 45%.

What is claimed is:

1. A selectively inclining treadmill which supports a user ambulating thereon, the selectively inclining treadmill comprising:
 a support base;
 a treadbase pivotally connected to the support base, the treadbase being selectively movable between a declined position, a neutral position, and an inclined position relative to the support base; and
 a single central extension device that selectively moves the treadbase relative to the support base, the extension device having a first end connected to the support base and a second end connected to the treadbase;
 the extension device is transversely oriented with respect to the treadbase so that the second end of the extension device is located rearward of the first end of the extension device when the treadbase is inclined;
 the extension device comprising a motor and at least three telescoping members that retract and extend to enable the treadbase to decline to about a −5% grade and incline to about a 30% grade relative to the support base;
 the at least three telescoping members comprise a lead cylinder having a bore extending at least partially therethrough, at least a portion of the bore being threaded;
 the at least three telescoping members including a first lead screw disposed at least partially within the bore of the lead cylinder, at least a portion of an outer surface of the first lead screw having threads that engage the threads within the bore of the lead cylinder, wherein relative rotation between the lead cylinder and the first lead screw causes the first lead screw to move further into or out of the bore of the lead cylinder;
 the first lead screw including a bore extending at least partially therethrough with at least a portion of the bore being threaded;
 the at least three telescoping members further including a second lead screw disposed at least partially within the bore of the first lead screw, at least a portion of an outer surface of the second lead screw having threads that engage the threads within the bore of the first lead screw, wherein relative rotation between the first lead screw and the second lead screw causes the second lead screw to move further into or out of the bore of the first lead screw;
 the second lead screw including a first fitting that is connected to a first cross member of the treadbase so that the second lead screw cannot rotate about a central axis of the second lead screw;
 wherein the first fitting allows the second lead screw to pivot with respect to the first cross member;
 wherein the lead cylinder is rotatably mounted on the motor; and
 a second fitting connected to the motor, wherein the second fitting is connected to a second cross member of the base support.

2. The selectively inclining treadmill of claim 1, wherein the lead cylinder moves substantially linearly closer to and further away from the motor.

3. The selectively inclining treadmill of claim 1, wherein the first lead screw is movable both rotationally relative to the motor and linearly closer to and further away from the motor.

4. The selectively inclining treadmill of claim 1, wherein the second lead screw is rotatably mounted on the motor.

5. The selectively inclining treadmill of claim 1, wherein the second lead screw moves substantially linearly closer to and further away from the motor.

6. The selectively inclining treadmill of claim 1, wherein at least two of the at least three telescoping members rotate relative to the motor, and at least two of the at least three telescoping members move linearly relative to the motor.

7. The selectively inclining treadmill of claim 1, wherein the extension device has a retracted length and an extended length, wherein a ratio between the extended and retracted lengths is about 2.

* * * * *